United States Patent [19]
Tanner

[11] 3,750,238
[45] Aug. 7, 1973

[54] PLASTIC SPRING LOCK
[75] Inventor: Robert G. Tanner, St. Charles, Mo.
[73] Assignee: Arundale Manufacturers, Inc., St. Louis, Mo.
[22] Filed: Dec. 28, 1971
[21] Appl. No.: 212,968

[52] U.S. Cl............ 24/1.81, 24/208 A, 24/217, 24/230, 24/265 B, 248/239
[51] Int. Cl............ A44b 21/00, A47g 29/02
[58] Field of Search............ 24/201 S, 90 PR, 24/230 F, 217, 208 A, 265 B, 1.8, 1.81; 85/8.3; 287/58 CT, 103 A; 248/239, 408

[56] References Cited
UNITED STATES PATENTS

| | | | |
|---|---|---|---|
| 2,164,831 | 7/1939 | Moore | 24/1.81 |
| 3,078,064 | 2/1963 | Turnbull | 248/239 |
| 2,477,877 | 8/1949 | Jeffrey | 24/265 B |
| 1,194,793 | 8/1916 | Styers | 287/103 A |
| 2,007,538 | 7/1935 | Kraemer | 24/265 B |
| 3,017,682 | 1/1962 | Vollet | 85/8.3 |

Primary Examiner—James T. McCall
Assistant Examiner—Kenneth J. Dorner
Attorney—John M. Howell et al.

[57] ABSTRACT

This invention relates to a spring lock and particularly to one made entirely of plastic with the exception of the spring itself wherein there is included a stud member having means at one end to provide a seat for the spring and tapered protrusions on its side. A plastic thimble-type sleeve fits over the stud and has elongated slots in which the protrusions slide and means at its closed end for providing a seat for the spring. The stud has recesses which allow distortion of the open end of the sleeve as it is forced over the tapered protrusion for assembling the lock. The spring is mounted between the closed end of the sleeve and the stud to bias the sleeve away from the stud.

8 Claims, 9 Drawing Figures

PATENTED AUG 7 1973  3,750,238
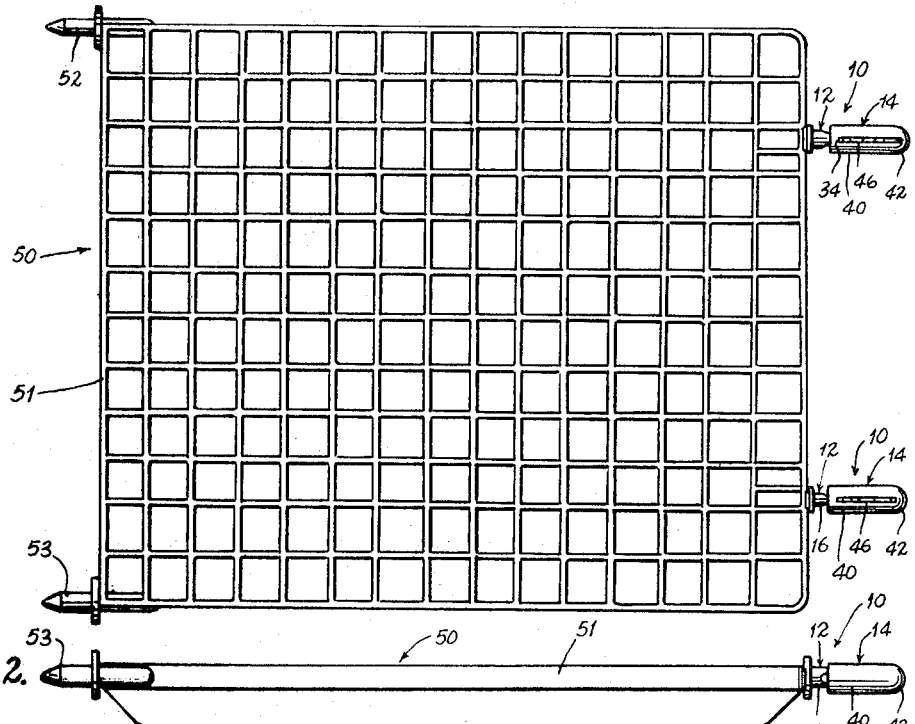
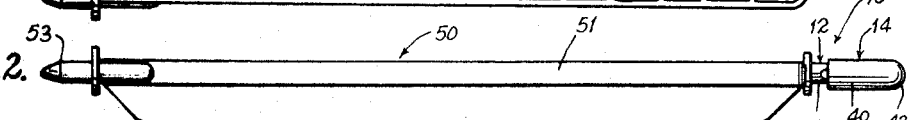
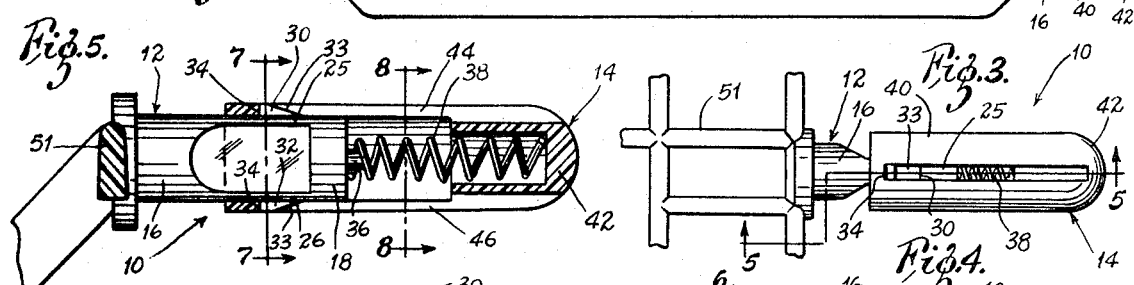
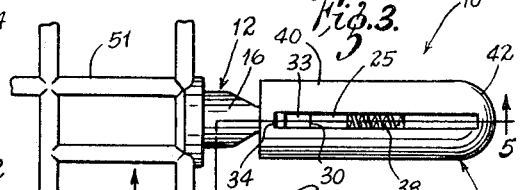
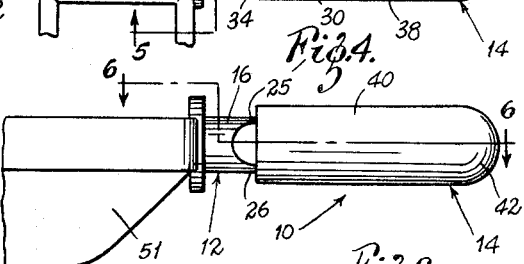
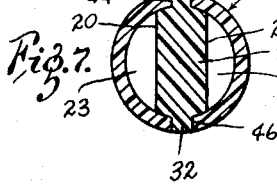
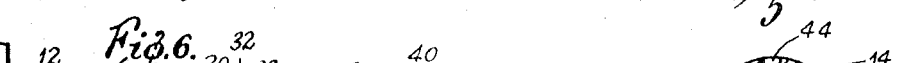
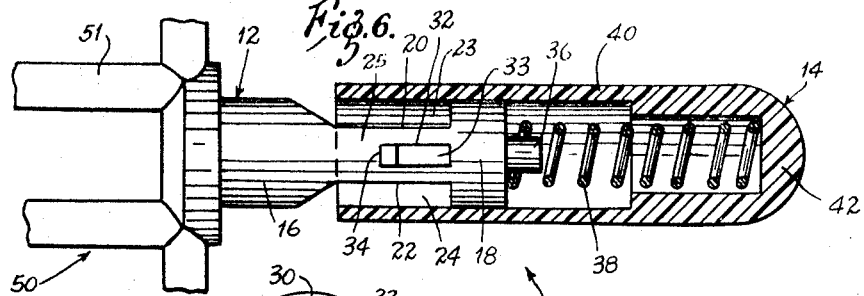
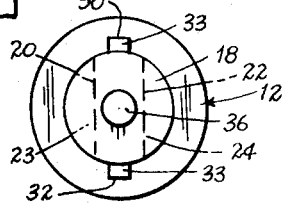
INVENTOR:
ROBERT G. TANNER,
BY Rogers, Ezell, Eilers & Robbins
ATTORNEYS

PLASTIC SPRING LOCK

SUMMARY OF THE INVENTION

This invention relates to a spring lock device that is easily assembled without tools, held together without fasteners such as screws or the like which can rust or corrode, and made entirely of plastic with the exception of the spring itself.

The device includes a stud member and a thimble-type sleeve that fits over the stud member. The stud member has a pair of diametrically opposed tapered protrusions extending from its side between which are recesses which allow distortion of the open end of the sleeve as it is forced over the protrusions during assembly of the device. The sleeve has a pair of diametrically opposed slots in its side in which the protrusions slide. The protrusions also prevent the sleeve from sliding completely off the stud once the lock is assembled.

A spring is mounted between the closed end of the sleeve and the stud to bias the sleeve away from the stud.

This device has many applications, one of which is in the clothes dryer field for providing a quick and simple means for removably mounting a clothes rack in a clothes dryer. The rack can be made of plastic with the stud member of the lock formed integrally therewith. Because no tools are required for assembly, and no holding devices, such as screws or the like, are required to hold the sleeve in slideable engagement with the stud member, the device is very inexpensive to manufacture and very reliable.

Hence, it is a primary object of this invention to provide a spring lock device made entirely of plastic with the exception of the spring itself, that is very easy to assemble, reliable, and includes a minimum of parts.

DESCRIPTION OF THE DRAWING

FIG. 1 is a plan view of a rack assembly having the plastic spring lock of this invention;

FIG. 2 is a side elevational view of the rack assembly of FIG. 1;

FIG. 3 is a plan view on an enlarged scale of the upper right-hand corner of FIG. 1 to better illustrate the plastic spring lock of this invention;

FIG. 4 is a side elevational view of the plastic spring lock of FIG. 3;

FIG. 5 is an enlarged view in section taken along the line 5—5 of FIG. 3;

FIG. 6 is an enlarged view in section taken along the line 6—6 of FIG. 4;

FIG. 7 is an enlarged view in section taken along the line 7—7 of FIG. 5;

FIG. 8 is an enlarged view in section taken along the line 8—8 of FIG. 5; and

FIG. 9 is a right end view of the stud member of FIG. 5.

DETAILED DESCRIPTION OF A PREFERRED EMBODIMENT

Referring to FIGS. 3 through 9 there is shown a plastic spring lock 10 of this invention having a cylindrical stud member 12 and a cylindrical thimble-type sleeve 14 that fits over the stud 12. The stud 12 has a cylindrical base portion 16 and a cylindrical head portion 18 with parallel flat sides 20 and 22 forming recesses 23 and 24 therebetween. Between the flat sides 20 and 22 are rounded surfaces 25 and 26 having the same radius of curvature as the portions 16 and 18 and on which are formed tapered protrusions 30 and 32, respectively, each having a tapered surface 33 and a rear surface 34, the rear surface 34 being generally perpendicular to the axis of the stud member 12. The protrusions 30 and 32 are tapered outwardly toward the rear of the stud member 12 to allow the sleeve 14 to slide to the left as viewed in the figures over the protrusions. A small nipple 36 extends axially from the head portion end of the stud member 12 to hold one end of a spring 38 in axial alignment as will be explained. The entire stud member 12, including the protrusions 30 and 32, is formed of plastic as a one-piece unit.

The sleeve 14 is also a plastic one-piece unit and has a portion 40 sized to fit in slideable engagement over the stud member 12 and a portion 42 internally smaller in diameter than the portion 40 to provide a seat for the other end of the spring 38. The sleeve 14 also has a pair of diametrically opposed slots 44 and 46 extending from near the open end of the sleeve 14 substantially the entire length of the portion 40 for slideable movement of the protrusions 30 and 32 therein.

Hence, the entire spring lock is made of plastic with the exception of the spring 38.

To assemble the lock one end of the spring 38 is placed inside the portion 42 of the sleeve 14. The open end of the sleeve 14 is then placed over the head portion 18 of the stud portion 12 and forced over the tapered protrusions 30 and 32. Although the inside diameter of the portion 40 of the sleeve 14 is very nearly equal to the outside diameter of the stud member 12, because the sleeve 14 is made of plastic and therefore somewhat flexible, the recesses 23 and 24 allow the open end of the sleeve 14 to distort and stretch over the tapered protrusions 30 and 32. The sleeve 14 is forced over the protrusions 30 and 32 until the rear sides 34 of the protrusions are past the rear ends of the slots 44 and 46.

If the slots 44 and 46 are in alignment with the protrusions 30 and 32, the protrusions 30 and 32 will drop into the slots to lock the sleeve 14 in slideable engagement with the stud member 12. If the slots and protrusions are not in alignment, the sleeve 14 is simply rotated until the protrusions drop into the slots. Once the device is assembled, the rear sides 34 of the protrusions 30 and 32 engage the rear ends of the slots 44 and 46 under the spring bias to lock the sleeve in slideable engagement with the stud member.

Referring to FIGS. 1 and 2, there is shown a practical application for the plastic spring lock of this invention. A rack assembly 50 for holding clothes in a clothes dryer includes a tray portion 51, a pair of plastic spring locks 10 mounted on one side, and a pair of pointed studs 52 and 53 extending from an opposite side. The rack 50 is preferably of molded plastic with the studs 52 and 53 and the stud members 12 molded as an integral part of the rack. The dryer (not shown) has recesses that line up with the plastic spring locks 10 and studs 52 and 53.

To install the rack in the dryer, the spring locks 10 are inserted in their recesses and the rack is pushed to compress the springs 38. The studs 52 and 53 are then aligned with their recesses and the rack, and hence springs 38, released to lock the rack 50 in place with the spring locks 10 and studs 52 and 53 in their respective recesses. To remove the rack from the dryer, the rack is simply pushed against the springs 38 thereby compressing the spring locks 10 and removing the studs 52 and 53 from their recesses.

Hence, this invention provides a novel locking device made almost entirely of plastic, with a minimum number of parts, that is inexpensive to make, reliable, and easily assembled.

Various changes and modifications may be made in this invention, as will be readily apparent to those skilled in the art. Such changes and modifications are within the scope and teaching of this invention as defined by the claims appended hereto.

What is claimed is:

1. A spring lock device comprising a stud member having protrusions extending from its side, the protrusions being tapered outwardly from the front to the rear of the stud member, a sleeve slideably engaged over the stud member for axial movement with respect thereto, the sleeve having elongated slots in its side in which the protrusions slide, the slots terminating short of the sleeve ends, at least one end of the sleeve being open and sufficiently flexible to allow it to pass up and over the tapered protrusions for inserting the protrusions in the slots during assembly of the device, and a spring mounted between the sleeve and the stud member to bias the sleeve axially with respect to the stud member.

2. The device of claim 1 wherein the stud member includes recesses adjacent the protrusions to allow distortion of the one end of the sleeve when forced over the protrusions during assembly.

3. The device of claim 2 wherein the protrusions are diametrically opposed and the recesses are formed between the protrusions.

4. The device of claim 2 wherein the rear sides of the protrusions are substantially perpendicular to the axis of the stud member, whereby once the device is assembled, the sleeve is locked in sliding engagement with the stud member by the perpendicular sides of the protrusions engaging the rear ends of the slots.

5. The device of claim 1 wherein the spring is mounted between the front end of the stud member and the other end of the sleeve.

6. The device of claim 1 wherein the stud member and sleeve are each formed of plastic as a one-piece unit.

7. A spring lock device comprising a stud member having protrusions extending from its side, a sleeve slideably engaged over the stud member for axial movement with respect thereto, the sleeve having elongated slots in its side in which the protrusions slide, the slots terminating short of the sleeve ends, at least one end of the sleeve being open and sufficiently flexible and the stud member having recesses adjacent the protrusions to allow distortion of the one end of the sleeve for passing it over the protrusions such that the protrusions fall into the slots during assembly, and a spring mounted between the sleeve and the stud member to bias the sleeve axially with respect to the stud member.

8. The device of claim 7 wherein the front sides of the protrusions are tapered outwardly toward the rear of the stud member and the rear sides of the protrusions are substantially perpendicular to the axes of the stud member, the stud member and sleeve being each formed of plastic as a one-piece unit.

* * * * *